United States Patent [19]

Nisenson

[11] Patent Number: 4,859,429
[45] Date of Patent: Aug. 22, 1989

[54] OZONE GENERATING DEVICE

[75] Inventor: Jules Nisenson, Stamford, Conn.

[73] Assignee: Technological Resources Corp., Stamford, Conn.

[21] Appl. No.: 213,676

[22] Filed: Jun. 30, 1988

[51] Int. Cl.$^4$ .............................................. C01B 13/11
[52] U.S. Cl. .......................... 422/186.13; 422/186.14; 422/186.18; 422/186.19; 422/907; 422/186.11
[58] Field of Search ...................... 422/186.07, 186.16, 422/186.15, 186.14, 186.11, 186.08, 186.13, 186.18, 186.19, 907

[56] References Cited

U.S. PATENT DOCUMENTS

| | | | |
|---|---|---|---|
| 1,149,254 | 8/1915 | Dumars. | |
| 2,118,969 | 5/1938 | Daily | 204/32 |
| 2,404,778 | 7/1946 | Allison | 204/313 |
| 3,677,931 | 7/1972 | O'Hare. | |
| 3,842,286 | 10/1974 | Imris | 250/535 |
| 3,843,882 | 10/1974 | Presnetsov et al. . | |
| 3,899,684 | 8/1975 | Tenney | 250/535 |
| 3,963,625 | 6/1976 | Cowther | 250/533 |
| 4,051,043 | 9/1977 | Harter et al. | 250/531 |
| 4,128,768 | 12/1978 | Yamato et al. | 250/535 |
| 4,152,603 | 5/1979 | Imris | 250/535 |
| 4,214,962 | 7/1980 | Pincon. | |
| 4,386,055 | 5/1983 | McBride. | |
| 4,462,965 | 7/1984 | Azuma et al. | 422/186.08 |
| 4,614,573 | 9/1986 | Masuda. | |
| 4,656,010 | 4/1987 | Leitzke et al. . | |
| 4,694,376 | 9/1987 | Gesslauer. | |

Primary Examiner—John F. Terapane
Assistant Examiner—Susan Wolffe
Attorney, Agent, or Firm—Charles E. Temko

[57] ABSTRACT

An electronic type ozone generating device utilizing an elongated tube or cylinder having a negative electrode in the form of a fine wire, and a conductive coating on an inner surface of the tube connected to a source of positive potential, whereby air to be ionized forms a dilectric. In contrast to prior art devices in which the air to be treated flows in substantially continuous fashion, means is provided for injecting fixed quantities of air to be treated in pulsed fashion to provide for greater effectiveness. In a second embodiment, means is provided for moving a plurality of fine wire electrodes in an orbital path within the tube relative to the principal axis thereof to provide greater ionization.

1 Claim, 3 Drawing Sheets

OZONE GENERATING DEVICE

BACGROUND OF THE INVENTION

This invention relates generally to the field of air treatment, and more particularly to an improved ozone generating device of electronic type. Devices of this general type are known in the art, and the invention lies in specific constructional details which permit greater efficiency in operation and a higher percentage of ozone generated in the treated air.

Most electronic devices include an enclosed chamber into which untreated air is fed and from which treated air containing ozone is drawn. The chamber acts as a capacitor, and is supplied with a relatively high voltage, usually direct current, so that the treated air forms a dilectric. Oxygen normally comprises only about 20 percent of the air by volume, and the entire amount of this oxygen is not readily converted to ozone by conventional methods. However, ozone is increasingly effective as a water purifier, and is preferable to chlorine for this purpose due to the tendency of chlorine in solution to form carcinogens with organic material present in natural water sources.

The most common type of static discharge generator is the silent arc discharge, also known as corona discharge and brush discharge. It includes two electrodes separated by a gap, a dilectric material inserted in the gap, a gas in the gap, and sufficient voltage potential between the two electrodes to cause current to flow through the dilectric and gas. The electrodes may be flat, tubular, or any configuration which allows their opposing surfaces to be parallel; the dilectric material can be any of numerous formulations of glass, ceramics, etc. The voltage will be a function of the gap distance and the dilectric material.

SUMMARY OF THE INVENTION

Briefly stated, the invention contemplates the provision of an improved ozone generating device of a class described in which the efficiency of operation has been enhanced. This is accomplished by the injection of air to be treated in pulsed rather than continuous fashion, so that the air, during treatment, remains in the device for a longer period of time. During this period of time, the current is also cyclically employed for maximum efficiency and is interrupted during the air injection and draining. This feature is also included in a second disclosed embodiment of the invention, which incorporates plural fine wires, or filaments, comprising the negative electrode, which are arranged upon a frame for orbital movement within an elongated tube or chamber to provide greater exposure of the air molecules to the filaments. In addition, greater turbulence is created by providing baffles on the frame element which supports the filaments to still further enhance exposure of the air to the filaments.

In a third disclosed embodiment of the invention, a plurality of tubes are arranged in concentric fashion together with common means for injected untreated air and removing treated air from the tubes. Surrounding the tubes is a larger tube which acts as a conduit for cooling air, each of the plurality of tubes having axially arranged cooling fins lying in the path of the cooling air.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENTS

Figure 1:
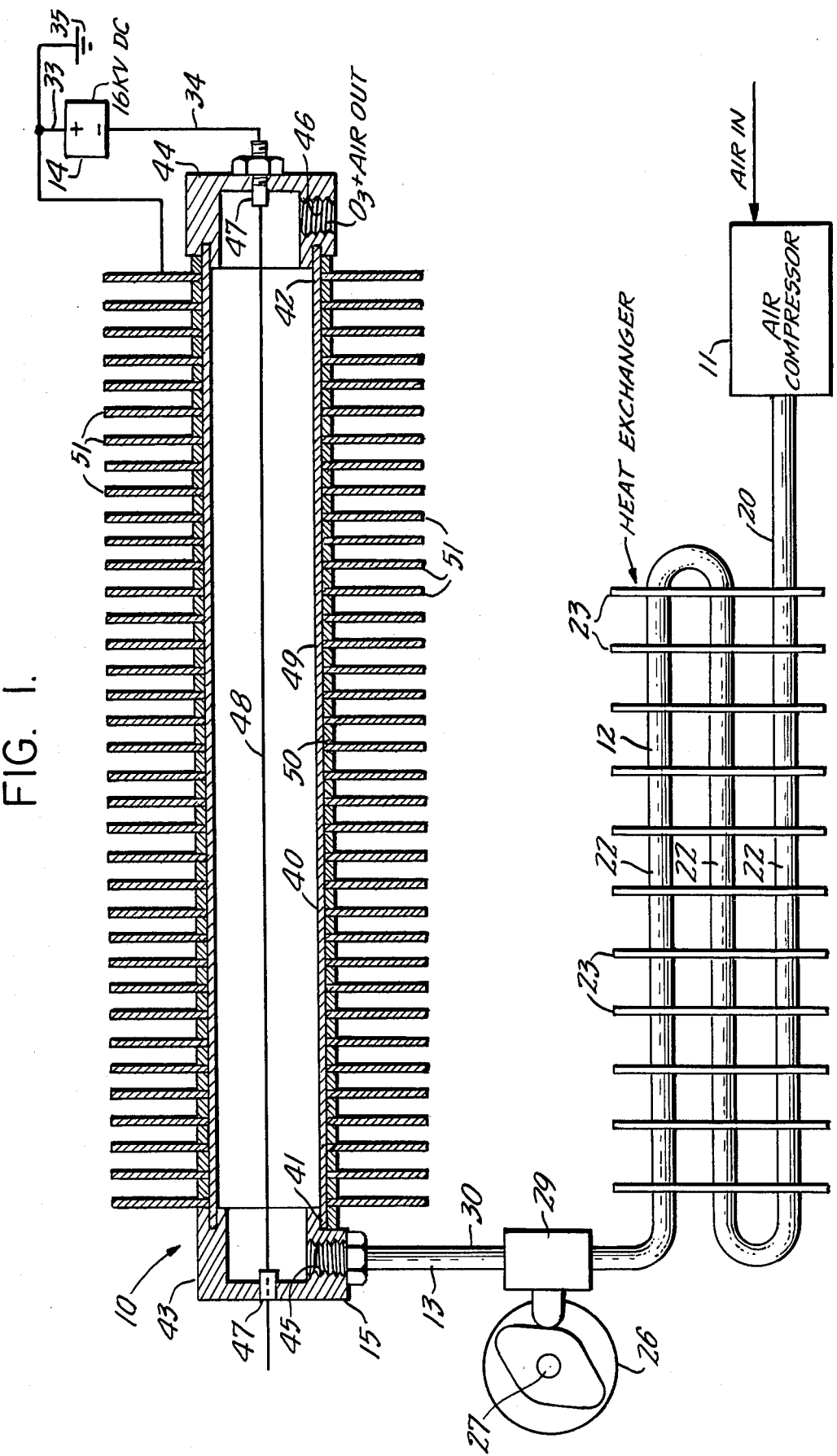
FIG. 1 is a schematic view of an embodiment of the invention.

In accordance with the first embodiment of the invention, the device, generally indicated by reference character 10, comprises broadly: an air compressor element 11, a heat exchanger element 12, an injector element 13, a power supply element 14, and an air treatment element 15.

The air compressor element 11 may be any standard-type compressor, and is employed to produce approximately four pounds above atmospheric pressure. The output is fed to a conduit 20, connected to the heat exchanger element 12.

The heat exchanger element 12 is likewise of known type, preferably including a plurality of continuous tube segments 22 passing through cooling fins 23.

The injector valve element 13 includes a timing motor 26, and an output shaft 27 which drives a cam, which normally rotates at 60 revolutions per minute. The cam bears against an air valve 29, the profile of the cam being such that the valve is normally open or conductive approximately 25 percent of the total time cycle and closed during the remaining 75 percent. Untreated air, compressed and cooled, travels through a conduit 30 to the air treatment element 15.

The power supply element 14 may also be of known type, producing 13 K.V. D.C. A first positive conductor 33 and second negative conductor 34 are connected as shown in the drawing. The negative conductor is suitably grounded at 35.

The air treatment element 15 includes an elongated cylinder 40 having first and second ends 41 and 42, each having a cap member 43 and 44. Each cap member includes a laterally oriented bore at 45 and 46, as well as well as axially aligned supports 47, which support a fine wire 48 of 0.003 inches in diameter, which forms the negative electrode. An inner surface 49 of the tube 40 is suitably coated for conductivity. The outer surface 50 communicates with the cooling fins 51.

During operation, the compressor element 11 operates substantially continuously, feeding air to the heat exchanger element 12 and the valve element 13. The valve element 13 will normally be open approximately 25 percent of the time of an operating cycle, during which time the pressure is sufficient to substantially replace the air within the tube 40.

Power from the power supply element may be supplied continuously, or, if desired, may be pulsed. Treated air exits from the bore 46, the air containing both ozone and oxygen, which may be separated in a well-known manner. Since the untreated air is injected in pulsed fashion, it remains relatively stationary during a substantial part of the time cycle for maximum contact with the wire 48.

The second embodiment, generally indicated by reference character 60, is generally similar, but provides a negative electrode in the form of plural wires which are orbitally moved during operation to provide maximum exposure to an individual charge of untreated air during the cycle. The tube 61 is provided with end caps 62 and 63, which provide engagement with a rotary support frame 64 through bearings 65 and 66. A driven shaft 67 is powered by a low speed motor 68, which operates continuously to drive a rotating frame 69. Plural wires 70 are separated from each other by radially extending baffles 71, which move with the frame 69. Thus, during rotation, the baffles create additional turbulence in a rotary direction tending to place the maximum amount of air within the tube into contact with at least one of the individual wires 70.

Figure 5:
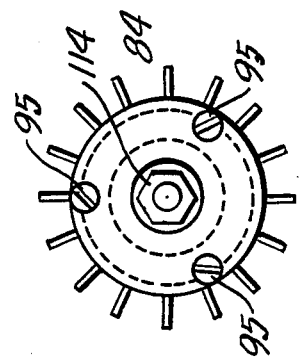
FIG. 5 is an end elevational view, with certain parts removed for purposes of clarity, as seen from the left-hand portion of FIG. 4.
Figure 3:
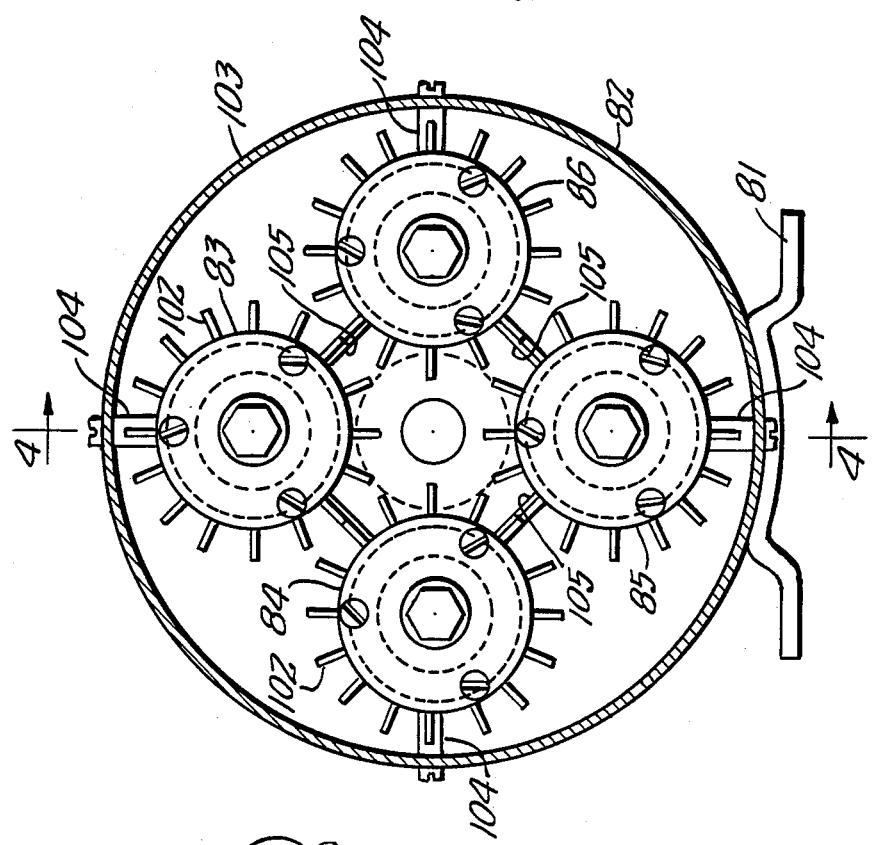
FIG. 3 is a cross-sectional view of a third embodiment of the invention.
Figure 2:
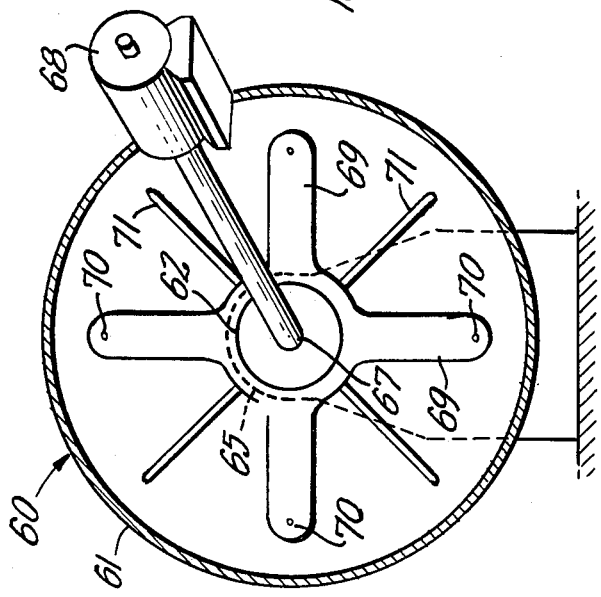
FIG. 2 is a fragmentary schematic view of a second embodiment of the invention.
Figure 4:
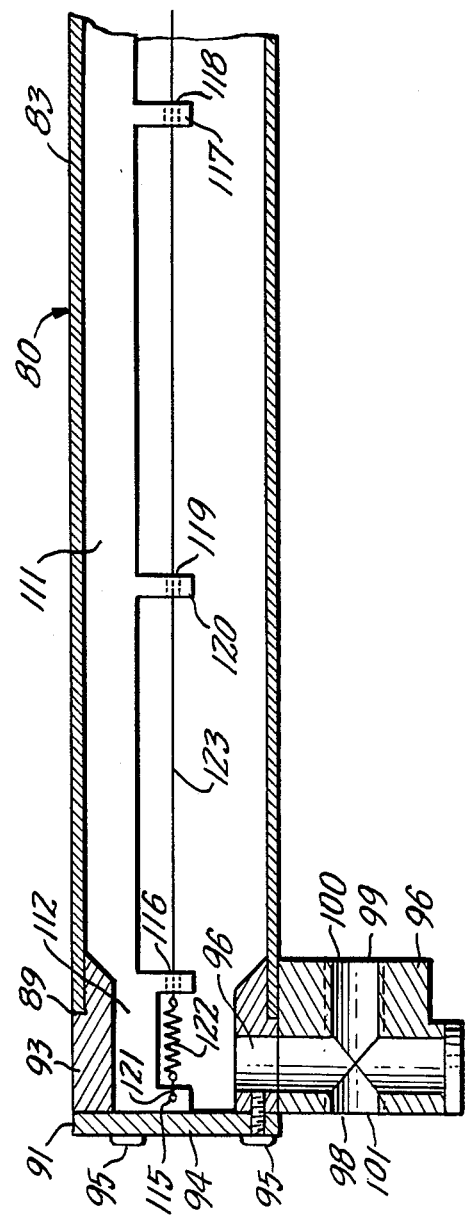
FIG. 4 is a fragmentary longitudinal sectional view thereof, as seen from the plane 4—4 in FIG. 3.

Turning now to FIGS 3, 4, and 5, there is illustrated a third embodiment of the invention, generally indicated by reference character 80 suitable for use where larger volumes of air are required. In this embodiment, a supporting base 80 supports an elongated cylindrical housing 80 within which are supported four tube elements 83, 84, 85, and 86. Referring to FIG. 4, each of the tube elements 83–86 includes a hollow cylindrical tube 88 extending between first and second ends 89 and 90. The ends engage cap elements 91 and 92, each including a cylindrical number 93 and an end wall number 94 attached thereto by screws 95. The end cap elements each include a laterally oriented orifice 96 employed for air supply or exhaust from a centrally disposed member 96–96A. These members each include radially extending bores 98 and axially extending bores 99 so as to be capable of supplying or exhausting each of the tube elements 83–86 in parallel fashion. Thus, the bores 99 include an open end 100 and a closed end 101.

The tubes 83–86 are provided with cooling fins 102, which are axially arranged, and preferably formed of black-coated aluminum. The cooling air is supplied to the interior of the larger cylinder 103 supported on mounting brackets, one of which is indicated by reference character 104. Inner mounting brackets 105 engage fins on the tube elements 83–86 and serve an alignment purpose.

Each of the tubes 83–86 supports an elongated frame 111 having ends 112 including aligning pins 113 which are threadedly engaged by a retaining nut 114. Each of the ends includes a filament anchor point 115 defined by a transverse bore 116. A medially disposed supporting member 117 includes an aligned bore 118. A third supporting member 119 includes an aligned bore 120. A terminal member 121 engages a tension spring 122, the opposite end of which engages an end of the filament 123.

Since the filament forms a capacitive function, rather than a conductive one, I have found that current flow is improved by making the filament as fine in diameter as possible, consistent with mechanical strength. Using a current of 15,000 volts, current flow with a filament of 0.003 inches has been measured at 2.5 milliamperes. By contrast, a diameter of 0.004 inches allows a current flow of 2.0 milliamperes, and a diameter of 0.005 inches, a current flow of 1.7 milliamperes.

I wish it to be understood that I do not consider the invention to be limited to the precise details of structure shown and set forth in this specification, for obvious modifications will occur to those skilled in the art to which the invention pertains.

I claim:

1. An ozone generating device comprising: an air treatment element including a cylindrical tube having end caps forming air inlet and outlet means at opposed ends thereof, said tube having an electrically conductive inner surface forming a positive electrode, a plurality of fine wires supported between said end caps forming a negative electrode, power supply means interconnecting said negative and positive electrodes, compressor means supplying untreated air at above atmospheric pressure to said tube, cooling means receiving the output of said compressor means and communicating with said air inlet means, and cyclically operated valving means controlling the flow of air from said cooling means to said inlet means, whereby air is introduced into said tube in a pulsed manner, frame means for mountng said fine wires eccentrically between said end caps with respect to the principal access of said tube, and means for the rotating said frame about the access of said tube; a plurality of baffles, mounted upon said frame and positioned between adjacent fine wires, whereby upon rotation of said frame about said access of said tube, said baffles create turbulence.

* * * * *